United States Patent
Anderson (10) Patent No.: US 7,216,002 B1
(45) Date of Patent: May 8, 2007

(54) SYSTEM AND METHOD FOR GROUP CONTENT SELECTION

(75) Inventor: Glen J. Anderson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 725 days.

(21) Appl. No.: 10/041,839

(22) Filed: Oct. 22, 2001

(51) Int. Cl.
*G05B 15/00* (2006.01)
*H04Q 7/00* (2006.01)

(52) U.S. Cl. .................. 700/1; 700/276; 340/519.13

(58) Field of Classification Search ............... 709/204, 709/205; 700/276; 340/539.13
See application file for complete search history.

(56) References Cited

U.S. PATENT DOCUMENTS

| | | | |
|---|---|---|---|
| 5,582,763 A * | 12/1996 | Yamada et al. | 252/299.01 |
| 5,781,108 A | 7/1998 | Jacob et al. | |
| 5,812,865 A | 9/1998 | Theimer et al. | |
| 5,854,923 A | 12/1998 | Dockter et al. | |
| 5,854,985 A * | 12/1998 | Sainton et al. | 455/553.1 |
| 5,945,988 A | 8/1999 | Williams et al. | |
| 6,052,676 A | 4/2000 | Hekmatpour | |
| 6,081,750 A | 6/2000 | Hoffberg et al. | |
| 6,084,516 A * | 7/2000 | Yasushi et al. | 340/573.1 |
| 6,498,955 B1 * | 12/2002 | McCarthy et al. | 700/1 |
| 2002/0166119 A1 * | 11/2002 | Cristofalo | 725/34 |
| 2003/0227439 A1 * | 12/2003 | Lee et al. | 345/156 |
| 2004/0054789 A1 * | 3/2004 | Breh et al. | 709/229 |

FOREIGN PATENT DOCUMENTS

WO    WO 99/63458    12/1999

OTHER PUBLICATIONS

K. Bharat and L. Cardelli, "Migratory Applications", Nov. 1995, In Proceedings of the Eighth ACM Symposium on User Interface Software and Technology, pp. 133-142.*
John Bates, David Halls, and Jean Bacon, "A Framework to Support Mobile Users of Multimedia Applications", 1996, ACM Mobile Networks and Nomadic Applications (NOMAD), 1(4).*
John Bates, David Halls, and Jean Bacon, "Middleware support for mobile multimedia applications", Nov. 1997, ICL Systems Journal, 12(2):289-314.*
Joseph F. McCarthy and Theodore D. Anagnost, "MUSICFX: An Arbiter of Group Preferences for Computer Supported Collaborative Workouts", 1998, In Proceedings of the ACM 1998 Conference on Computer Supported Cooperative Work (CSCW 98), pp. 363-372.*

(Continued)

*Primary Examiner*—Krisna Lim
*Assistant Examiner*—Aaron Strange
(74) *Attorney, Agent, or Firm*—Scott Charles Richardson; McGrath, Geisler, Olds & Richardson (57) ABSTRACT

The present invention is directed to a system and method for group content selection. In an aspect of the present invention, a method for providing content based on user preferences may include detecting a plurality of users at a location and identifying user profiles corresponding to at least a portion of the plurality of users. At least one content characteristic common to the identified user profiles is determined and content including the determined common content characteristic output at the location.

21 Claims, 8 Drawing Sheets

OTHER PUBLICATIONS

Stefan Marti and Kwan Hong Lee, "The Adaptive Song Selector or Locator (ASSOL)", Dec. 2000, Ttechnical report, Available at: http://web.media.mit.edu/~stefanm/ass/.*

The American Heritage College Dictionary, Fourth Edition, 2002, pp. 981.*

D. L. Chao, J. Balthrop, and S. Forrest, "Adaptive Radio: Achieving Consensus Using Negative Preferences", 2004, Technical Report TR-CS-2004-08, The University of New Mexico Department of Computer Science, Albuquerque, NM.*

* cited by examiner

SYSTEM AND METHOD FOR GROUP CONTENT SELECTION

FIELD OF THE INVENTION

The present invention generally relates to the field of selection of content, and particularly to a system and method for group content selection based on user preference, presence of users and the like.

BACKGROUND OF THE INVENTION

Consumers have ever-increasing access to a variety of forms of content and media. From web pages, streaming video and audio data, cable, digital subscriber line (DSL), radio, television, satellite, and the like, users may obtain content from a variety of sources. Further, the content may be output by a variety of devices, such as convergence systems, wireless devices, information handling systems, personal digital assistants, integrated music players, portable media players, and the like. Thus, consumers are confronted both by the variety of content, and the variety of systems that may be utilized to access the content.

Additionally, a plurality of consumers may wish to interact with content utilizing a shared device. For example, a music player may be provided for outputting audio content to listeners in a room. However, it may be difficult for the users to reach a consensus regarding the type of content the users wish to have output by the system. Reaching such a consensus may require a great deal of bargaining by the consumers, such as voicing preferences, negotiating, and other such processes which may require a great deal of time and effort, thereby greatly reducing the overall experience.

Further, with the great variety of content and player choices, it may be difficult to find a suitable device to output desired content. For example, on a home system, a consumer may wish to interact with an item of content in more than one location, but may have difficult in selecting and transferring such content to the location.

SUMMARY OF THE INVENTION

Accordingly, the present invention is directed to a system and method for group content selection. In a first aspect of the present invention, a method for providing content includes identifying a first user profile corresponding to a first user and a second user profile corresponding to a second user and determining at least one content characteristic common to at least the first user and the second user based on the first user profile and the second user profile. Content including the determined common characteristic is output to the first user and the second user.

In a second aspect of the present invention, a method for providing content based on user preferences includes detecting a plurality of users at a location and identifying user profiles corresponding to at least a portion of the plurality of users. At least one content characteristic common to at least a portion of the identified user profiles is determined and content including the determined common content characteristic output at the location.

In a third aspect of the present invention, a system for providing output includes a means for detecting a plurality of users at a location, a means for identifying user profiles corresponding to at least a portion of the plurality of users, a means for determining at least one content characteristic common to the identified user profiles; and a means for outputting content including the determined common content characteristic at the location.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 8, exemplary embodiments of the present invention are shown. A plurality of users may be confronted with a wide range of content choices and devices that may be utilized to output the content. Such choices have become even more confusing as devices have become integrated and interconnected. For example, a television may be communicatively linked not only to an audio system, but also to information handling systems, such as desktop computers, portable computers, and the like over both wired and wireless systems. By utilizing the present invention, a system and method for providing content may be employed in which user profiles, detected users and a preponderance of content characteristics may be utilized to provide content in an efficient and user-friendly manner.

Figure 1:
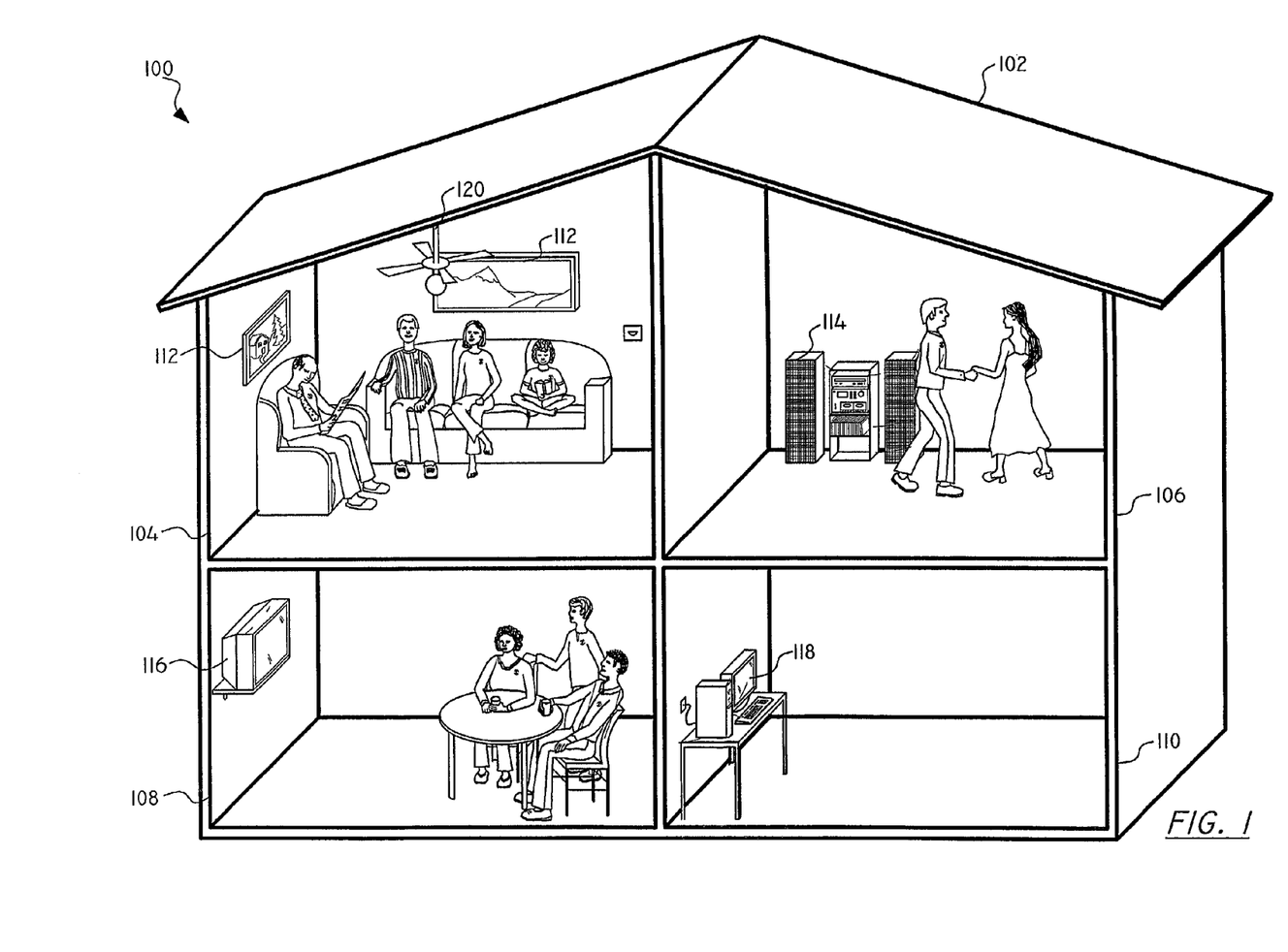
FIG. 1 is an illustration of an embodiment of the present invention wherein users at a variety of locations receive targeted content based on the presence of the users.

Referring now to FIG. 1, an embodiment 100 of the present invention is shown wherein users at a variety of locations receive targeted content based on the presence of the users. A plurality of users is located in rooms 104, 106, 108 & 110 throughout a house 102. Additionally, output devices, such as a wall hangings 112, audio system 114, television 116, desktop computer 118, ceiling fan 120, and the like are located in each respective room 104, 106, 108 & 110. However, each of the users located in the room may have certain desires with regards to their surroundings, such as personal taste in music, desired air temperature, and the like.

The present invention provides a method in which content may be targeted for the users, and may be based on the available devices, to enable an overall improved experience both with respect to output devices outputting content as well as output devices affecting the environment of the user, such as temperature, humidity, and the like.

Figure 2:
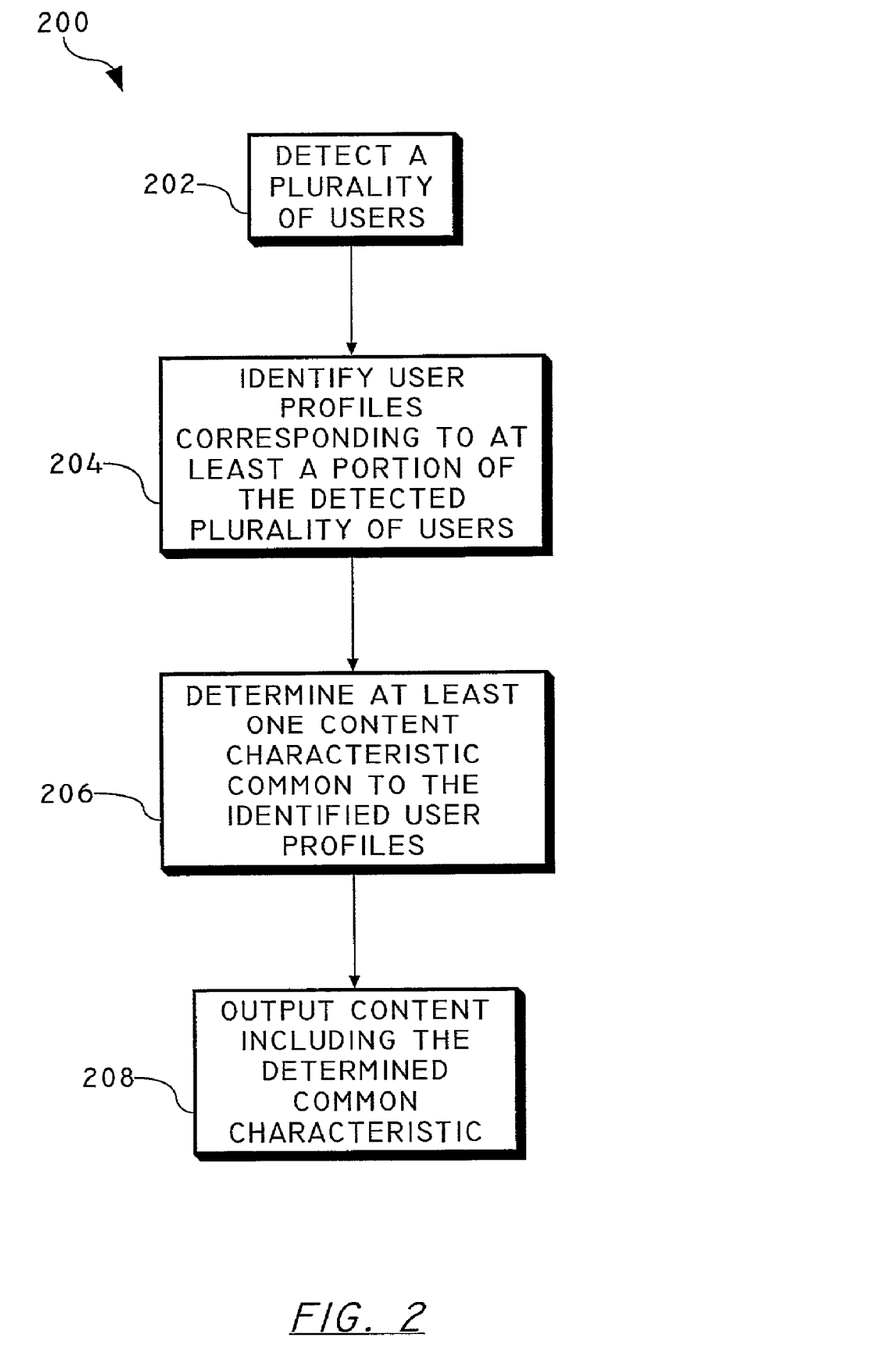
FIG. 2 is a flow diagram depicting an exemplary method of the present invention wherein user profiles for detected users are utilized to output content including common characteristics to the users.

Referring now to FIG. 2, an exemplary method 200 of the present invention is shown wherein user profiles for detected users are utilized to output content including common characteristics to the users. A plurality of users is detected 202. For instance, sensors may be positioned so as to detect users at a given location, users may input their presence at a given location, and the like as contemplated by a person of ordinary skill in the art. User profiles are identified corresponding to at least a portion of the detected plurality of users 204. The user profiles may include a listing having content characteristics as desired by a user. In certain instances, a user profile may not be identified for a user, such as when encountering a new user, and the like, therefore, a general user profile may be generated, such as based on general demographic information based on users present, based on past users encountered by the system, and the like as contemplated by a person of ordinary skill in the art.

At least one content characteristic common to the identified user profiles is determined 206. For example, a content characteristic may be shared by a greater number of the users than other content characteristics, as indicated by a user profile. It should be noted that to be a common characteristic indicates that a characteristic is shared by at least a portion of the user profiles, and does not require the characteristic be shared by all the profiles. For instance, a common characteristic shared by two or more users of a plurality of users may be utilized, and further, a preponderance of users may be utilized to determine a desired characteristic. Content may then be output including the determined common characteristic 208. In this way, content may be provided which shares characteristics enjoyed by at least a portion of the users which may receive the content, such as users at a given location, and the like.

Figure 3:
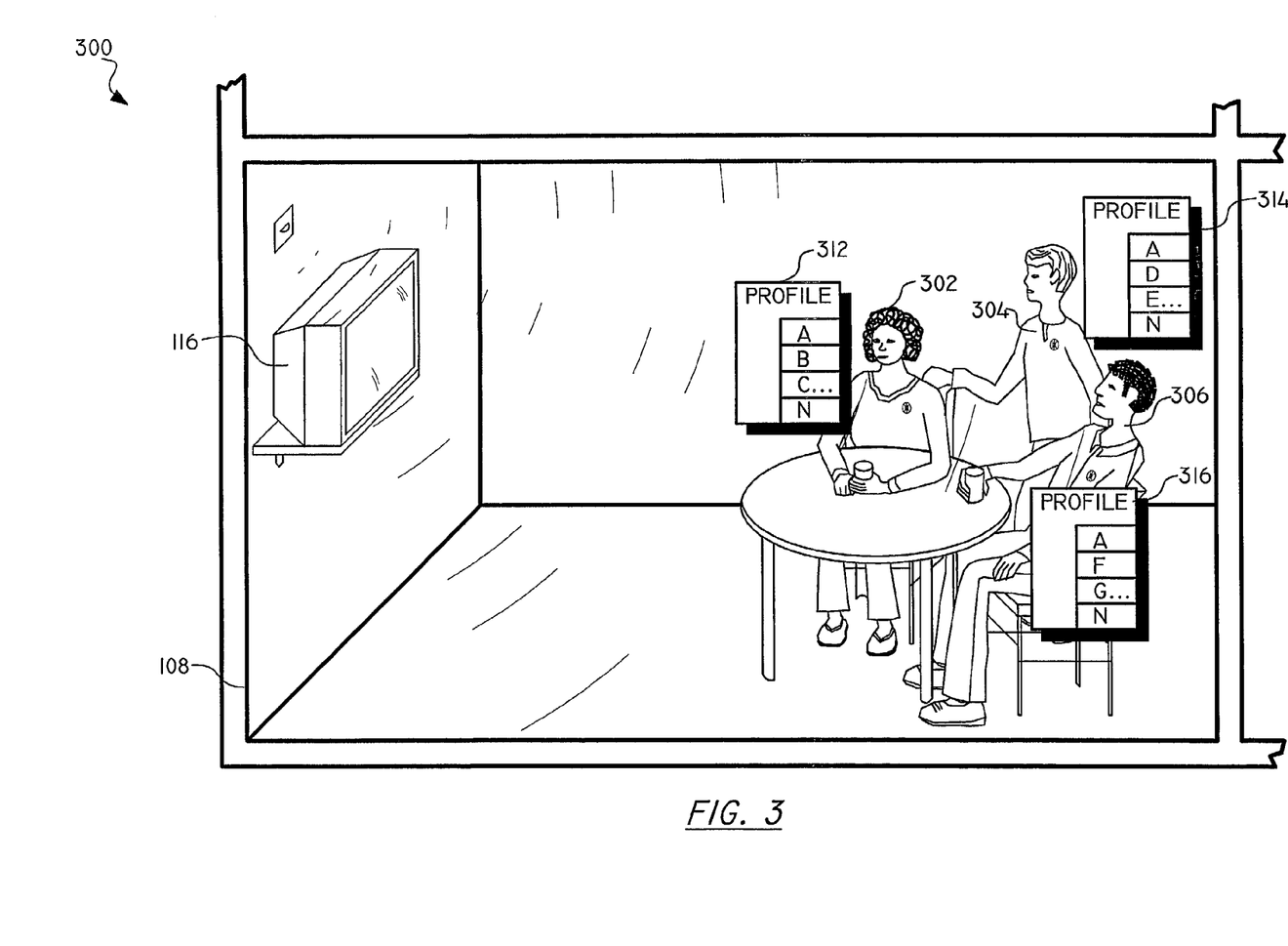
FIG. 3 is an illustration of an embodiment of the present invention wherein users and user profiles are shown.

Referring now to FIG. 3, an embodiment 300 of the present invention is shown wherein users and user profiles are shown. A plurality of users 302, 304 & 306 is situated at a location to view an output device, in this instance a television 116. Each user 302, 304 & 306 has a corresponding user profile 312, 314 & 316 that indicates content characteristics desired by a user. For instance, a first user 302 may have a first user profile 312 indicating preferences of "A," "B," "C," and up to "N." Likewise, the second user 304 has a second user profile 314 indicating preferences of "A," "D," "E," and up to "N," and a third user 306 has a third user profile 312 indicating preferences of "A," "F," "G," and up to "N," The preferences common to the users, in this instance preference "A" may then be utilized in an aspect of the present invention to determine content for being output by an output device, such as the television 116.

Figure 4:
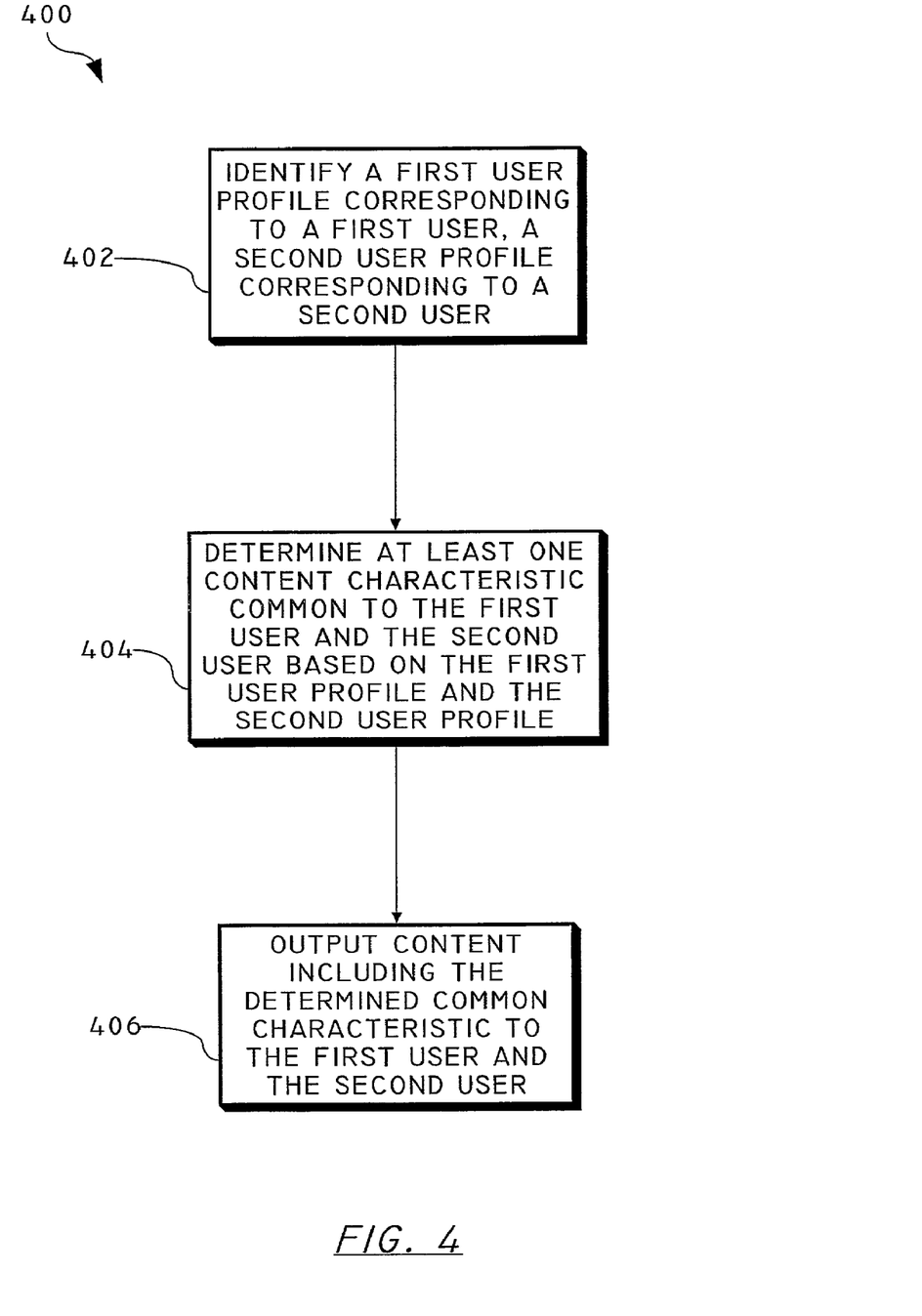
FIG. 4 is a flow diagram depicting an exemplary method of the present invention wherein a characteristic common to users is utilized to provide content having the common characteristic.

For instance, referring now to FIG. 4, an exemplary method 400 of the present invention is shown wherein a characteristic common to a preponderance of users is utilized to provide content having the common characteristic. A first user profile is identified corresponding to a first user, a second user profile is identified as corresponding to a second user 402 and optionally a third or greater user profile is identified corresponding to a third or greater user, such as the users shown in FIG. 3.

A content characteristic common to at least the first user and the second user based on the user profiles is determined 404. A content characteristic may include style of content, content author, content performer, output mode of content, content playing device, and the like without departing from the spirit and scope of the present invention. Additionally, content may include audio data, visual data, graphics, pictures, surface covering display, aroma, ambiance, lighting, temperature, airflow and the like as contemplated by a person of ordinary skill in the art. Further, an average may be obtained of content characteristics to determine a preponderance of common characteristics, priority may be given to users, such as by weighting characteristics based on the user, and the like.

Content including the determined common characteristic is output to the first user, the second user 406 and optionally, a third user. For example, as shown in FIG. 3, a television show having the desired characteristic common to the first user 302 and the second user 304, such as a comedy, may be output by a television 116 to the first user 302, second user 304 and third user 306.

Figure 5:
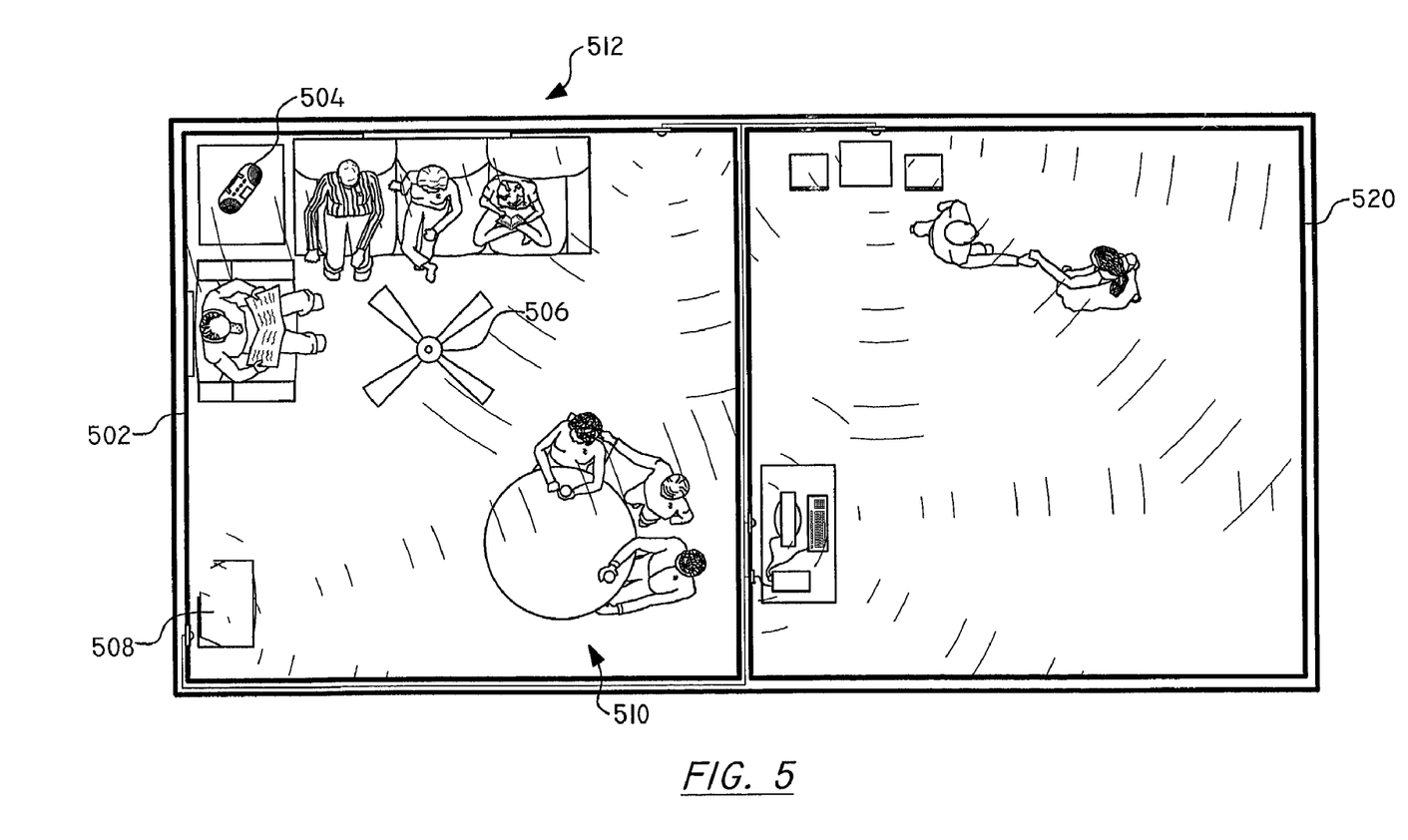
FIG. 5 is an illustration of an embodiment of the present invention wherein content is provided to users based on at least one of proximity and orientation.

Referring now to FIG. 5, an embodiment 500 of the present invention is shown wherein content is provided to users based on at least one of proximity and orientation. A plurality of users may have access to a variety of output devices in a room 502, such as a radio 504, ceiling fan 506, television 508, and the like. However, the users may not wish to interact with all the devices. For instance, a first group of users 510 may wish to view a television 508, while a second group of users 512 may wish to listen to a radio 504. Additionally, both groups of users 510 & 512 may wish to control a ceiling fan 506. By utilizing the present invention, the output of each device may be implemented based on orientation and/or position of the users with respect to the devices. Orientation and/or position of users may be detected utilizing a plurality of devices and methods, such as ultrasonic, heat signature, facial recognition, voice indications, inputs as received by a user, radio frequency indication based on a badge worn by a user, and like methods and systems as contemplated by a person of ordinary skill in the art.

In this example, the first group of users 510, based on their orientation indicating that they wish to receive the output of the device, such as to view a television program displayed by the television 508, is used to determine the output of the television 508. Additionally, the second group of users, and their respective user profiles, is utilized to control the output of the radio 504 based on location of the users 512 relative to the radio. Further, both the first group of users 510 and the second group of users may be utilized to control the ceiling fan 506. In this way, proximity and location of users may be utilized to determine output with respect to a plurality of devices.

Figure 6:
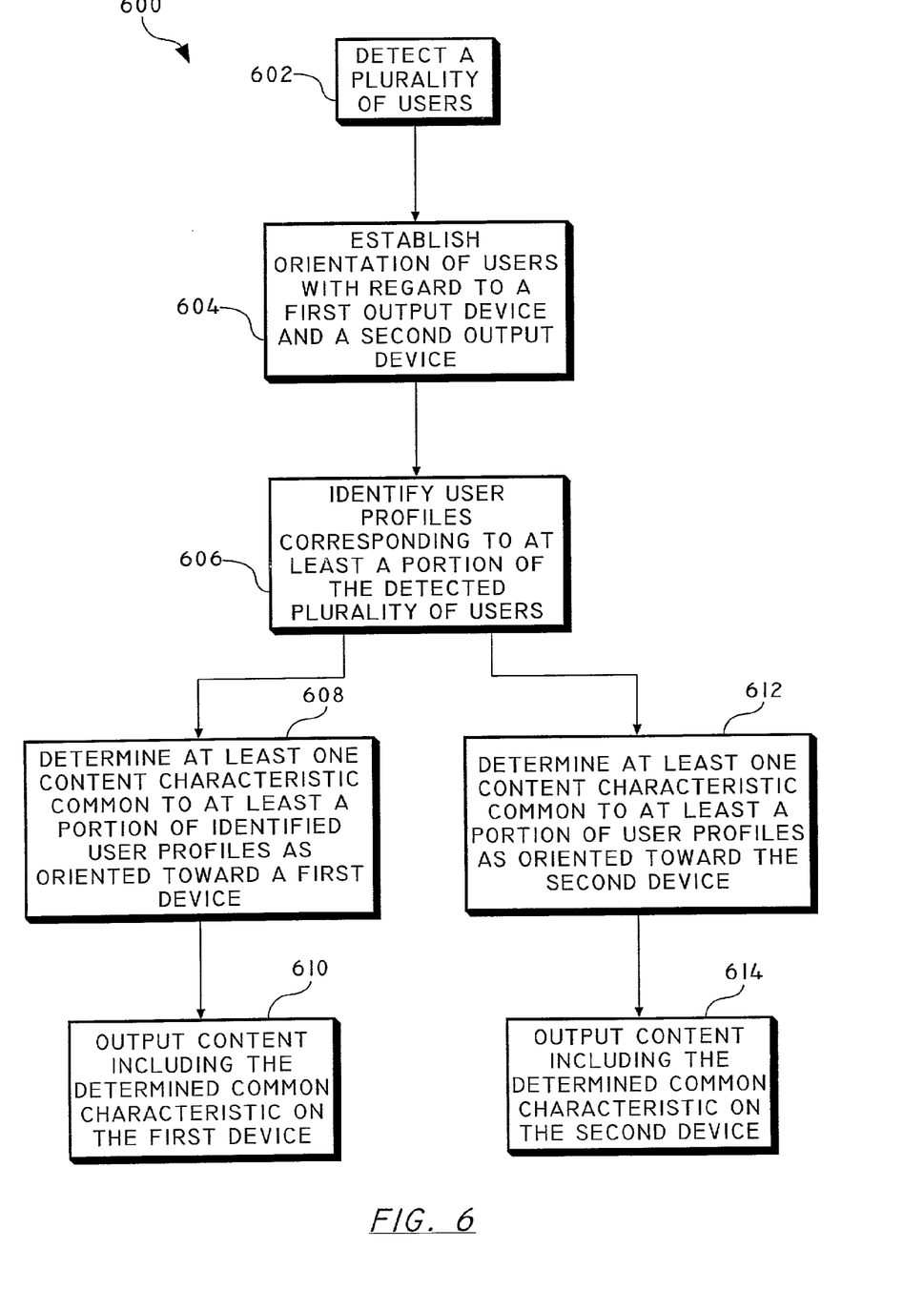
FIG. 6 is a flow diagram depicting an exemplary method of the present invention wherein orientation of a plurality of users is utilized in conjunction with a user profile to determine an output of an output device.

For instance, referring now to FIG. 6, an exemplary method 600 of the present invention is shown wherein orientation of a plurality of users is utilized in conjunction with a user profile to determine an output of an output device. A plurality of users is detected 602. An orientation of the users is established with regards to a first output device and a second output device 604. For example, the users may each have a transmitter sending a signal, which is received by a sensor or sensors to determine the orientation of a user, based on voice output by a user during targeted and/or passive output to the system, and the like. User profiles are identified corresponding to at least a portion of the detected plurality of users 606. Then, at least one content characteristic is determined common to the identified user profiles as oriented toward a first device 608. For example, a characteristic common to at least a portion of the users may be utilized to determine content. Content is then output by the first device that includes the determined common characteristic 610. Likewise, at least one content characteristic is determined for identified user profiles as oriented toward a second device 612, and content output included the determined common characteristic 614. Thus, output may be targeted to users based on their orientation with respect to a device so that content is provided to users with a greater likelihood of desired interaction with the device.

Users may also move between rooms, and still wish for a complete and continuous experience. For example, referring again to FIG. 5, a user receiving output from a device in a first room 502, may move from the first room 502 to a second room 520. Additionally, the user may wish to continue to interact with the content received in the first room 502 so as to continue the experience. However, there may be additional users in the next room, may only enter the room for a limited period of time and thereby not wish to affect the output in the room for users already there, and the like. Thus, it may be desirable to enable a user to have a continuous experience with an item of content, and further, have the experience in such a way so as not to inconvenience users already at the location.

Figure 7:
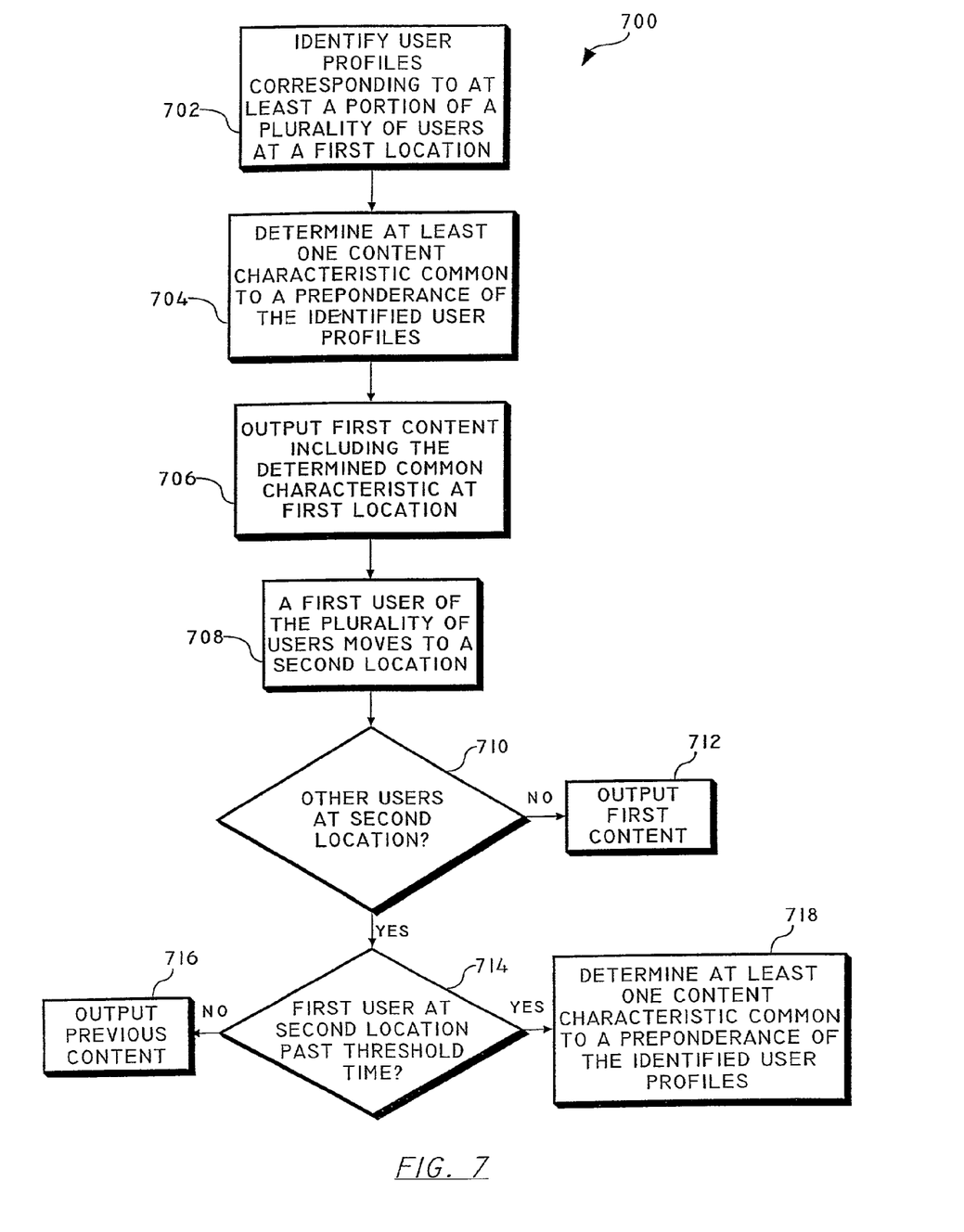
FIG. 7 is a flow diagram depicting an exemplary method of the present invention wherein a user moving from a first location to a second location may continue to receive output received at the first location in such a way so as to not inconvenience users already at the second location.

Referring now to FIG. 7, an exemplary method 700 of the present invention is shown wherein a user moving from a first location to a second location may continue to receive output received at the first location in such a way so as to not inconvenience users already at the second location. As described previously, user profiles corresponding to at least a portion of a plurality of users at a first location are identified 702, and at least one content characteristic common to a preponderance of the identified user profiles is determined 704. A first item of content is output at the first location including the determined common characteristic 706.

A first user of the plurality of users then moves to a second location 708. If there are no other users at the second location 710, the first content item may be output 712. Preferably, a determination is made automatically for the best available device to output the content. If there are users at the second location 710, a time determination is made to determine if the user is at the second location past a threshold time 714. If the user is not there a sufficient amount of time, such as by just walking through a room, the previous content output at the second location 716 continues without change. However, if the user has reached the threshold time 714, a determination is made for at least one content characteristic common to a preponderance of the identified user profiles 718 for users at the second location. In this way, the user does not intrude upon previous users at a location unless the user is there for a sufficient amount of time. A variety of other criteria may be utilized in conjunction with the present invention without departing from the spirit and scope of the present invention, such as time of day, conflicts with content output by other devices at a location, for instance, by not outputting content which may conflict with currently output content at the location, and the like.

Figure 8:
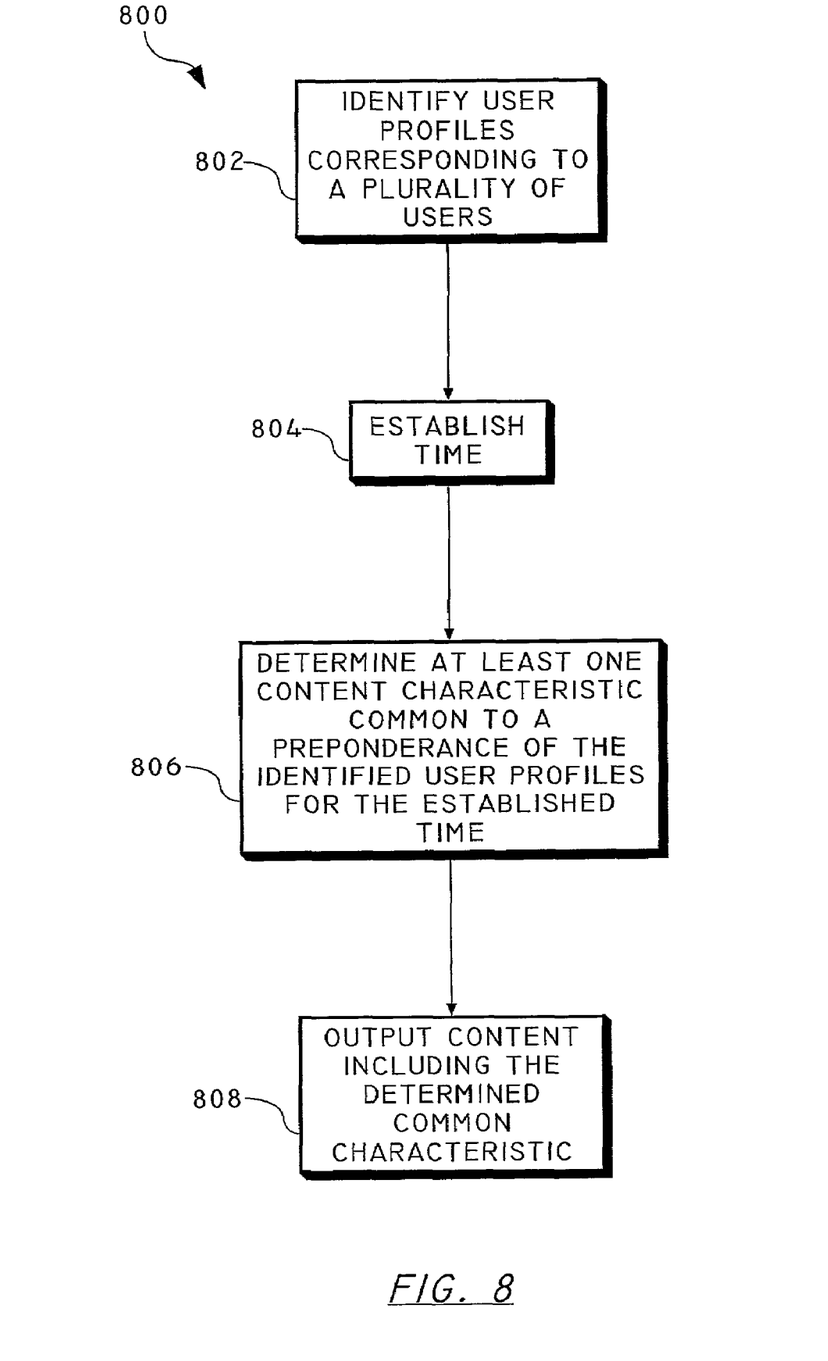
FIG. 8 is a flow diagram depicting an exemplary method of the present invention wherein a time element is utilized to provide desired content.

For example, referring now to FIG. 8, an exemplary method 800 of the present invention is shown wherein a time element is utilized to provide desired content. As before, user profiles are identified which correspond to a plurality of users 802. Time is established 804, such as time of day, day of week, month, year, and the like. At least one content characteristic common to a preponderance of the identified user profiles for the established time is determined 806. Content is then output including the determined common characteristic 808. Thus, a detailed profile for users may be provided to enable a complete content experience. Other profile aspects are contemplated by the present invention without departing from the spirit and scope thereof. For example, a system may be implemented which shared musical preferences in a database for access by systems, and may allow an online media seller to allow automated detection of media preferences. Further a system could gather profile data from other systems by sending invitations to user systems based on a known schedule of events.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for group media selection of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for providing content, comprising:

identifying a first user profile corresponding to a first user and a second user profile corresponding to a second user, the user profiles containing at least one content characteristic for a respective user;

determining first content characteristics common to at least the first user and the second user based on the first user profile and the second user profile;

outputting content including the first content characteristics to the first user and the second user in a first location;

detecting movement of the first user from the first location to a second location in which said content is not being outputted;

if a third user is present at the second location, determining an amount of time the first user remains at the second location;

determining second content characteristics common to the third user and the first user if the first user remains at the second location for at least a threshold amount of time while the third user is present at the second location; and establishing an orientation of the first user and the second user with regards to a first device and a second device, wherein the orientation is utilized to determine at least one characteristic of the first content characteristics common to users oriented with regard to at least one of the first device and the second device.

2. The method as described in claim 1, wherein the identified user profiles are at least one of: stored in a centralized database and received from the users.

3. The method as described in claim 1, wherein the first and second content characteristics include at least one of: style of content, content author and content performer.

4. The method as described in claim 1, wherein the first and second content characteristics include at least one of: output mode of content and content playing device.

5. The method as described in claim 1, wherein the content includes at least one of: audio data; visual data including at least one of graphics, pictures and surface covering appearance; aroma; ambiance lighting; temperature; and airflow.

6. The method as described in claim 1, further comprising establishing a time including at least one of time of day, time of week, time of month and time of year, wherein the established time is utilized in determining the first content characteristics.

7. The method as described in claim 1, wherein if the third user is not present at the second location, outputting the content at the second location without delaying the threshold amount of time.

8. The method as described in claim 1, further comprising generating a third user profile for the third user if the third user is present, wherein the third user profile is generated by at least one of general demographic information of users present and based on past users encountered.

9. The method as described in claim 1, further comprising outputting content including the second content characteristics at the second location.

10. The method as described in claim 1, further comprising establishing a position of the first user with regard to the first device, wherein the position is utilized in conjunction with the orientation to determine said at least one characteristic.

11. The method as described in claim 1, further comprising establishing at least one of an orientation or a position of the first user within the second location, wherein said at least one of the orientation or the position is utilized in determining the second content characteristics.

12. A system for providing content, comprising:
a means for detecting a plurality of users at a first location;
a means for identifying user profiles corresponding to at least a portion of the plurality of users, the portion of the plurality of users including a first user and a second user;
a means for determining first content characteristics common to the identified user profiles;
a means for outputting content including the first content characteristics at the first location;
a means for detecting movement of the first user from the first location to a second location in which said content is not being outputted;
a means for determining an amount of time the first user remains at the second location if a third user is present at the second location;
a means for determining second content characteristics common to the third user and the first user if the first user remains at the second location for at least a threshold time while the third user is present at the second location; and
a means for determining an orientation of at least the portion of the plurality of users with regards to a first device and a second device.

13. The system as described in claim 12, wherein the identified user profiles are at least one of stored in a centralized database and received from the users.

14. The system as described in claim 12, wherein the first and second content characteristics include at least one of style of content, content author and content performer.

15. The system as described in claim 12, wherein the first and second content characteristics include at least one of output mode of content and content playing device.

16. The system as described in claim 12, wherein the content includes at least one of audio data, visual data, graphics, pictures, surface coverings, aroma, ambiance lighting, temperature and airflow.

17. The system as described in claim 12, further comprising a clock suitable for establishing a time, wherein the time is utilized in conjunction with the user profiles for determining the first content characteristics.

18. The system as described in claim 12, wherein the determined orientation is utilized to determine at least one characteristic of the first content characteristics common to users oriented with regard to at least one of the first device and the second device.

19. The system as described in claim 18, further comprising:
a means for establishing a position of the first user with regard to the first device, wherein the position is utilized in conjunction with the orientation to determine said at least one characteristic.

20. The system as described in claim 12, wherein if the third user is not present at the second location, outputting the content output at the second location without delaying the threshold amount of time.

21. The system as described in claim 12, further comprising:
means for establishing at least one of an orientation or a position of the first user within the second location, wherein said at least one of the orientation or the position is utilized in determining the second content characteristics.

* * * * *